United States Patent
Tanaka

(10) Patent No.: US 12,072,232 B2
(45) Date of Patent: Aug. 27, 2024

(54) OPTICAL FIBER SENSING SYSTEM, OPTICAL FIBER SENSING APPARATUS, AND RESERVOIR MONITORING METHOD

(71) Applicant: NEC Corporation, Tokyo (JP)

(72) Inventor: Tatsuki Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 197 days.

(21) Appl. No.: 17/640,472

(22) PCT Filed: Sep. 13, 2019

(86) PCT No.: PCT/JP2019/036229
§ 371 (c)(1),
(2) Date: Mar. 4, 2022

(87) PCT Pub. No.: WO2021/049035
PCT Pub. Date: Mar. 18, 2021

(65) Prior Publication Data
US 2022/0341773 A1 Oct. 27, 2022

(51) Int. Cl.
*G01H 9/00* (2006.01)
*E02B 7/38* (2006.01)

(52) U.S. Cl.
CPC ............... *G01H 9/004* (2013.01); *E02B 7/38* (2013.01)

(58) Field of Classification Search
CPC .. G01H 9/004; E02B 7/38; E02B 7/26; E02B 7/20; E02B 7/40
See application file for complete search history.

(56) References Cited

U.S. PATENT DOCUMENTS

| | | | | |
|---|---|---|---|---|
| 5,257,545 A | * | 11/1993 | Au-Yang | F16K 37/0083 376/245 |
| 2010/0271199 A1 | * | 10/2010 | Belov | G01M 5/00 340/539.3 |
| 2018/0136085 A1 | * | 5/2018 | Lochry | G01M 5/0091 |
| 2020/0180905 A1 | * | 6/2020 | Witczak | B66B 13/02 |
| 2020/0402679 A1 | * | 12/2020 | Hashemian | G05B 19/042 |

FOREIGN PATENT DOCUMENTS

| JP | S62-25845 A | 2/1987 |
|---|---|---|
| JP | H08-165633 A | 6/1996 |
| JP | 2002-061157 A | 2/2002 |
| JP | 2005-233918 A | 9/2005 |
| JP | 2011-174309 A | 9/2011 |
| JP | 2015-040467 A | 3/2015 |

OTHER PUBLICATIONS

Han et al., 2011, Monitoring Technique and System of Hydraulic Vibration of Sluice Gate in Long Distance Water Conservancy Project, Elsevier Ltd., Proceedings Engineering 15 (2011), 933-937 (Year: 2011).*
International Search Report for PCT Application No. PCT/JP2019/036229, mailed on Dec. 3, 2019.

* cited by examiner

*Primary Examiner* — Carib A Oquendo
(74) *Attorney, Agent, or Firm* — Sughrue Mion, PLLC

(57) ABSTRACT

An optical fiber sensing system according to the present disclosure includes an optical fiber (10) provided on a water discharge gate (30) of a reservoir or in a vicinity of the water discharge gate (30), a reception unit (21) configured to receive an optical signal including a vibration pattern from the optical fiber (10), and a detection unit (22) configured to detect whether an opening amount of the water discharge gate (30) is appropriate, based on a vibration pattern included in the optical signal.

20 Claims, 12 Drawing Sheets

OPTICAL FIBER SENSING SYSTEM, OPTICAL FIBER SENSING APPARATUS, AND RESERVOIR MONITORING METHOD

This application is a National Stage Entry of PCT/JP2019/036229 filed on Sep. 13, 2019, the contents of all of which are incorporated herein by reference, in their entirety.

TECHNICAL FIELD

The present disclosure relates to an optical fiber sensing system, an optical fiber sensing apparatus, and a reservoir monitoring method.

BACKGROUND ART

In a reservoir such as a dam, a water discharge gate (sluice gate) is opened at regular intervals for discharging water, and adjusts an amount of water in the reservoir. However, vibration generated at the water discharge gate by water discharge may affect the water discharge gate and cause deterioration of the water discharge gate and a member such as a bolt being used for the water discharge gate.

As an example of a method of alleviating deterioration of a member and the like of the water discharge gate, there is a method in which an observer on the site judges, through visual observation, an occurrence situation of vibration at the water discharge gate, and when the observer judges that vibration occurs, the occurrence of the vibration at the water discharge gate is alleviated by increasing, through visual observation, an opening amount of the water discharge gate and increasing an amount of water discharged. At this occasion, the observer monitors, through visual observation, a water surface state of the reservoir, and when ripples appear on the water surface, the observer judges that vibration occurs at the water discharge gate.

However, the above-described method is a method in which an observer judges, through visual observation, an occurrence situation of vibration at the water discharge gate on the basis of a water surface state of the reservoir, and increases, through visual observation, an opening amount of the water discharge gate, and therefore, the opening amount (=an amount of water discharged) is not always appropriate.

For example, when the opening amount of the water discharge gate is increased, occurrence of vibration at the water discharge gate can be alleviated, however, when the opening amount is excessively increased, resources (water) of the excessive quantity are wasted. Therefore, a technique of being able to determine whether the opening amount of the water discharge gate is appropriate is desired.

Techniques of performing various kinds of detection by using an optical fiber in a reservoir such as a dam have been suggested (for example, Patent Literatures 1 to 3).

Patent Literature 1 discloses a technique in which a demodulator provided at a location away from a dam gate and a strain sensor provided at the dam gate are connected via an optical fiber, and the demodulator measures a degree of opening of the dam gate on the basis of a wavelength of reflected light from the strain sensor.

Patent Literature 2 discloses a technique in which optical fibers are provided at locations where sluice gates exist in a sparse manner, and opening and closing of a particular sluice gate is detected on the basis of a quantity of light and a time of reception from the optical fiber.

Patent Literature 3 discloses a technique in which an optical fiber is provided in a contraction system that contracts by moisture, and when the contraction system contracts by moisture, a inundation location (a leakage location and the like of a dam) is detected by utilizing occurrence of light loss in the optical fiber.

CITATION LIST

Patent Literature

Patent Literature 1: Japanese Unexamined Patent Application Publication No. 2005-233918
Patent Literature 2: Japanese Unexamined Patent Application Publication No. 2002-061157
Patent Literature 3: Japanese Unexamined Utility Model Application Publication No. S62-025845

SUMMARY OF INVENTION

Technical Problem

However, the techniques disclosed in Patent Literature 1 and 2 are merely techniques for detecting a degree of opening and opening or closing of the water discharge gate (sluice gate). Also, the technique disclosed in Patent Literature 3 is merely a technique for detecting a leakage location and the like of the dam.

Therefore, even when the techniques disclosed in Patent Literatures 1 to 3 are combined, whether the opening amount of the water discharge gate is appropriate cannot be determined.

Accordingly, an object of the present disclosure is to provide an optical fiber sensing system, an optical fiber sensing apparatus, and a reservoir monitoring method that solve the above-described problems and are capable of determining whether an opening amount of a water discharge gate is appropriate.

Solution to Problem

An optical fiber sensing system according to one aspect includes:

an optical fiber provided on a water discharge gate of a reservoir or in a vicinity of the water discharge gate;

a reception unit configured to receive an optical signal including a vibration pattern from the optical fiber; and a detection unit configured to detect whether an opening amount of the water discharge gate is appropriate, based on the vibration pattern included in the optical signal.

An optical fiber sensing apparatus according to one aspect includes:

a reception unit configured to receive an optical signal including a vibration pattern from an optical fiber provided on a water discharge gate of a reservoir or in a vicinity of the water discharge gate; and a detection unit configured to detect whether an opening amount of the water discharge gate is appropriate, based on the vibration pattern included in the optical signal.

A reservoir monitoring method according to one aspect is a reservoir monitoring method performed by an optical fiber sensing system, the method including:

a reception step of receiving an optical signal including a vibration pattern from an optical fiber provided on a water discharge gate of a reservoir or in a vicinity of the water discharge gate; and a detection step of detecting whether an opening amount of the water discharge gate is appropriate, based on the vibration pattern included in the optical signal.

Advantageous Effects of Invention

According to the above-described aspects, an effect of providing an optical fiber sensing system, an optical fiber sensing apparatus, and a reservoir monitoring method that are capable of determining whether an opening amount of a water discharge gate is appropriate can be acquired.

DESCRIPTION OF EMBODIMENTS

Figure 1:
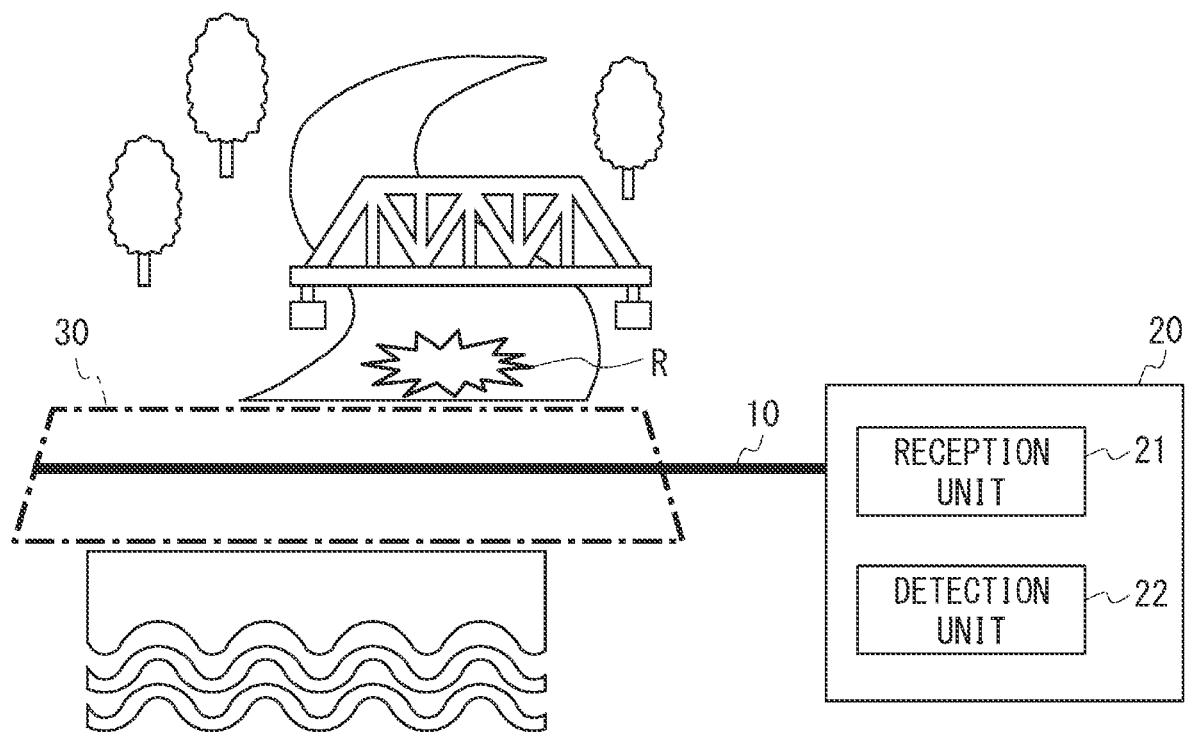
FIG. 1 is a diagram illustrating an example of configuration of the optical fiber sensing system according to a first example embodiment.

Hereinafter, example embodiments of the present disclosure will be described with reference to the drawings. In the following description and drawings, omissions and simplifications are made as appropriate for the sake of clarification of the explanation. Furthermore, in the drawings below, the same elements are denoted with the same reference numerals, and duplicate explanation thereabout is omitted as necessary.

First Example Embodiment

Figure 2:
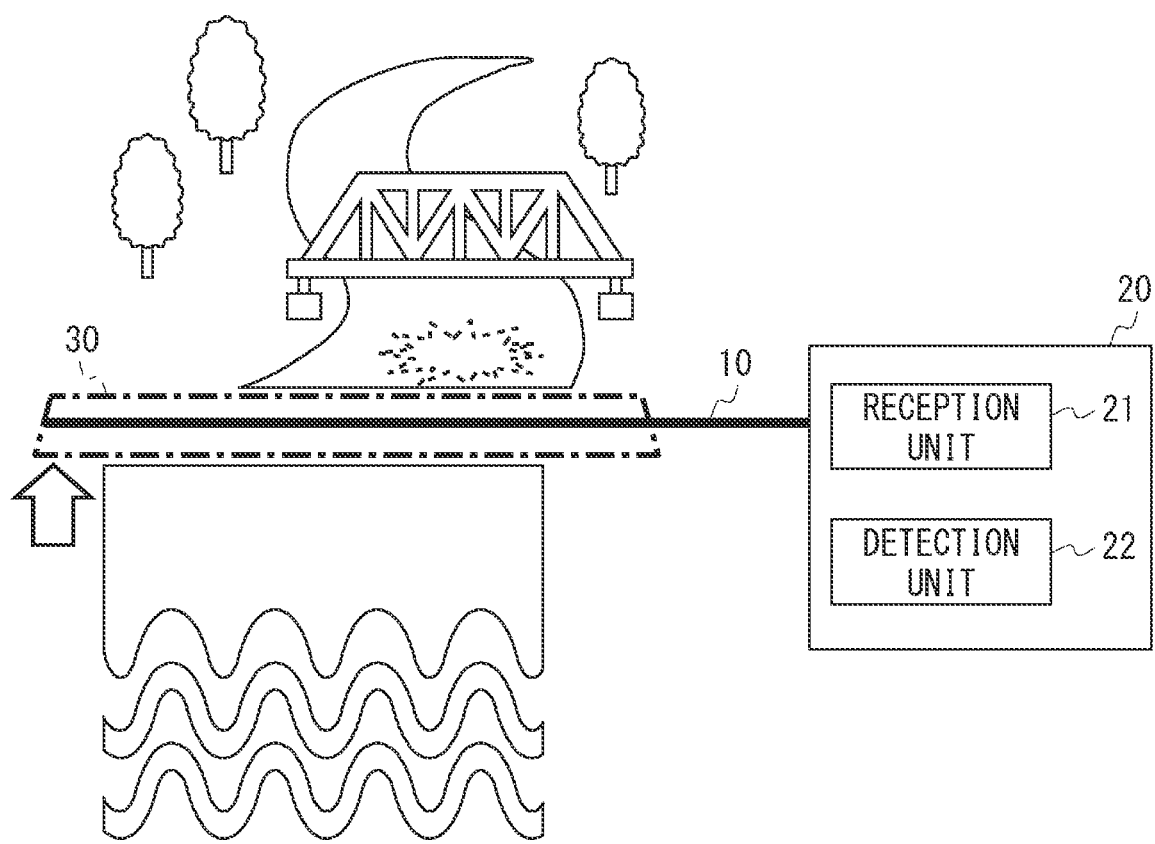
FIG. 2 is a diagram illustrating an example of configuration of the optical fiber sensing system according to the first example embodiment.

First, an example of configuration of an optical fiber sensing system according to this first example embodiment is explained with reference to FIG. 1 and FIG. 2. FIG. 1 illustrates a state in which water discharge is performed while the opening amount of a water discharge gate 30, explained later, is decreased. FIG. 2 illustrates a state in which water discharge is performed while the opening amount of the water discharge gate 30 is increased.

As illustrated in FIG. 1 and FIG. 2, the optical fiber sensing system according to this first example embodiment includes an optical fiber 10 and an optical fiber sensing apparatus 20. Also, the optical fiber sensing apparatus 20 includes a reception unit 21 and a detection unit 22.

The optical fiber 10 is provided on the water discharge gate 30 of the reservoir such as a dam, and one end of the optical fiber 10 is connected to the optical fiber sensing apparatus 20. However, the method for providing the optical fiber 10 is not limited thereto. The optical fiber 10 may be provided in a vicinity of the water discharge gate 30.

Figure 3:
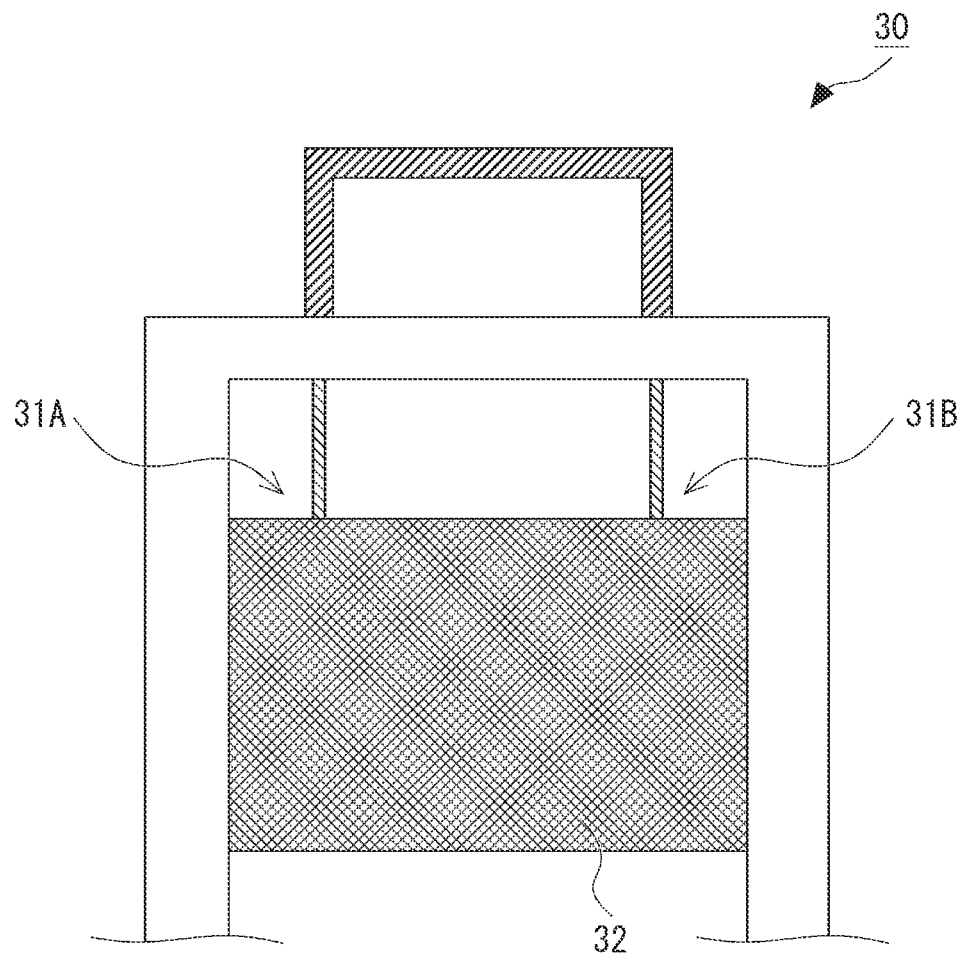
FIG. 3 is a diagram illustrating an example of configuration of a water discharge gate according to the first example embodiment.

For example, as illustrated in FIG. 3, the water discharge gate 30 is a gate (for example, a roller gate) having a structure that opens or closes the door body 32 by vertically moving the door body 32 upward and downward. In the example of FIG. 3, bolts 31A and 31B (hereinafter referred to as a "bolt 31" where the bolts 31A and 31B are not distinguished from each other) are used at the two places for suspending the door body 32. However, the structure of the water discharge gate 30 is not limited thereto. The water discharge gate 30 may be a gate (for example, a radial gate) having a structure that opens or closes a door body by rotating the door body around a fulcrum.

The reception unit 21 makes pulsed light incident into the optical fiber 10 and receives, through the optical fiber 10, reflected light and scattered light, as return light (an optical signal), generated as the pulsed light is transmitted through the optical fiber 10.

In this case, when the water discharge gate 30 is opened and the water is discharged from the reservoir, the water discharge gate 30 vibrates due to the water discharge. This vibration is transmitted to the optical fiber 10, which changes the wavelength of the return light transmitted through the optical fiber 10. Therefore, the optical fiber 10 can detect the vibration generated at the water discharge gate 30. In addition, because the wavelength of the return light transmitted through the optical fiber 10 changes according to the vibration generated at the water discharge gate 30, the return light includes a vibration pattern according to the occurrence situation of the vibration at the water discharge gate 30. This vibration pattern has a unique pattern that is different in the strength of vibration, the location of vibration, the transition of variation in the frequency, and the like.

Therefore, the detection unit 22 can detect the occurrence situation of the vibration of the water discharge gate 30 by analyzing dynamic change in the vibration pattern included in the return light received by the reception unit 21.

Also, the occurrence situation of the vibration of the water discharge gate 30 changes according to the opening amount of the water discharge gate 30. For example, as illustrated in FIG. 1, in a case where the opening amount of the water discharge gate 30 is small, a large vibration is generated at the water discharge gate 30 because a large water pressure is applied by the discharge of water. In this case, deterioration of the water discharge gate 30 and the bolt 31 may occur. In this case, ripples R appear on the surface of the water of the reservoir. Conversely, as illustrated in FIG. 2, in a case where the opening amount of the water discharge gate 30 is large, the vibration that occurs at the water discharge gate 30 is small, but when the opening amount is excessively large, resources (water) of the excessive quantity are wasted.

Therefore, the detection unit 22 can determine whether the opening amount of the water discharge gate 30 is appropriate on the basis of the occurrence situation of the vibration of the water discharge gate 30.

Therefore, in this first example embodiment, the detection unit 22 determines whether the opening amount of the water discharge gate 30 is appropriate on the basis of the vibration pattern included in the return light received by the reception unit 21.

In this case, an example of a method in which the detection unit 22 determines whether the opening amount of the water discharge gate 30 is appropriate is explained with reference to FIG. 4 to FIG. 6.

Figure 4:
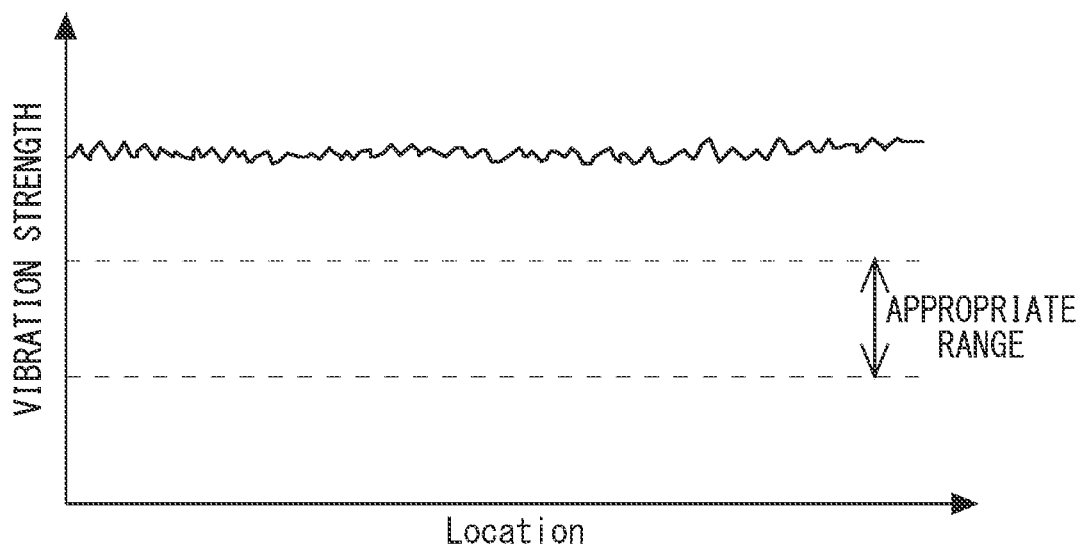
FIG. 4 is a diagram illustrating an example of a vibration pattern included in return light received by a reception unit according to the first example embodiment.
Figure 5:
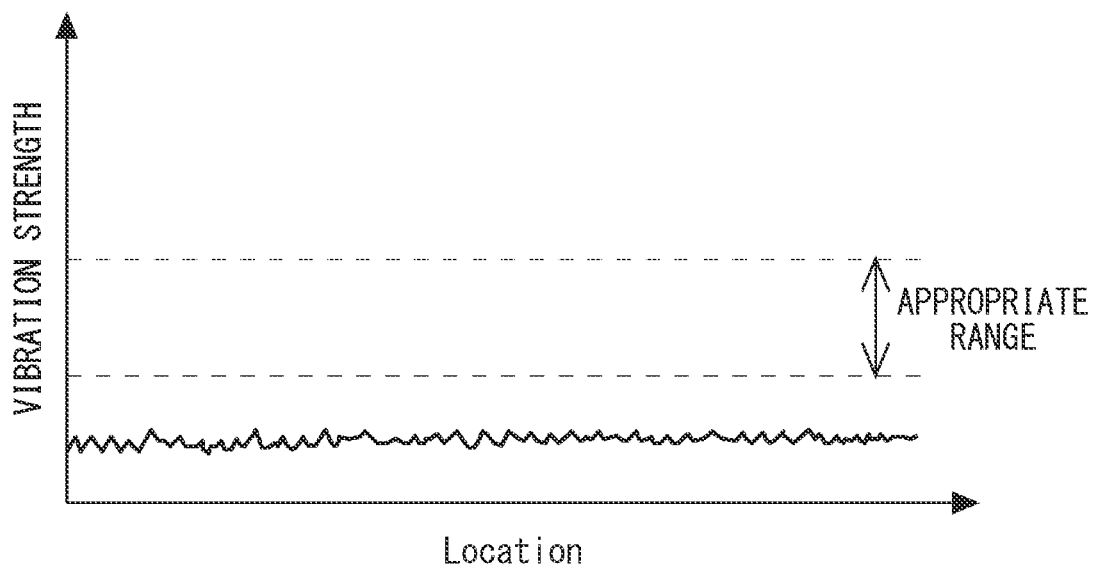
FIG. 5 is a diagram illustrating an example of a vibration pattern included in return light received by the reception unit according to the first example embodiment.
Figure 6:
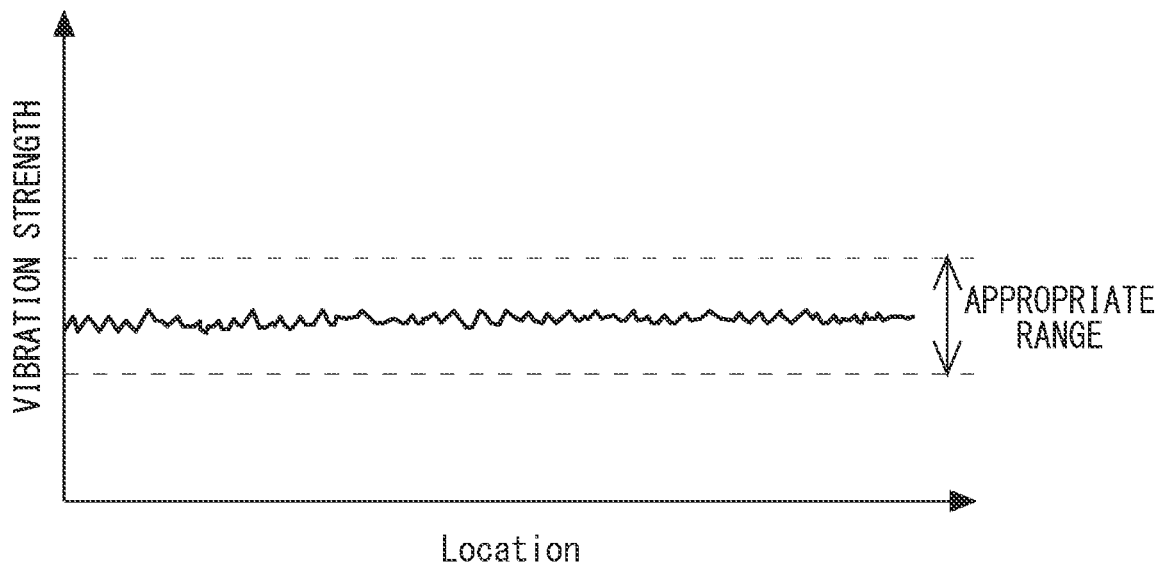
FIG. 6 is a diagram illustrating an example of a vibration pattern included in return light received by the reception unit according to the first example embodiment.

FIG. 4 to FIG. 6 illustrate examples of vibration patterns included in the return light received by the reception unit 21. The vibration patterns illustrated in FIG. 4 to FIG. 6 are vibration patterns at certain times. In FIG. 4 to FIG. 6, the horizontal axis indicates a location on the optical fiber 10 (a distance from the optical fiber sensing apparatus 20), and the vertical axis indicates a vibration strength at that location. For example, the detection unit 22 can detect a location on the optical fiber 10 (a distance from the optical fiber sensing apparatus 20) where the vibration pattern included in the return light is detected, on the basis of a time difference between a time at which the reception unit 21 makes pulsed light incident into the optical fiber 10 and a time at which the reception unit 21 receives return light from the optical fiber 10.

In the example of FIGS. 4 to 6, an appropriate range is set for the vibration strength.

Among them, in the example of FIG. 4, the vibration strength at each location on the optical fiber 10 is higher than the appropriate range. In this case, large vibrations occur at the water discharge gate 30, which may cause deterioration of the water discharge gate 30 and the bolt 31. Therefore, the detection unit 22 determines that the opening amount of the water discharge gate 30 is inappropriate.

In the example of FIG. 5, the vibration strength at each location on the optical fiber 10 is lower than the appropriate range. In this case, the opening amount of the water discharge gate 30 excessively large, and resources (water) of the excessive quantity may be wasted. Therefore, the detection unit 22 determines that the opening amount of the water discharge gate 30 is inappropriate.

Conversely, in the example of FIG. 6, the vibration strength at each location on the optical fiber 10 is within the appropriate range. In this case, it is considered that not only the deterioration of the water discharge gate 30 and the bolt 31 can be alleviated but also wasting of the resource (water) can be alleviated. Therefore, the detection unit 22 determines that the opening amount of the water discharge gate 30 is appropriate.

In this manner, in the example of FIGS. 4 to 6, in a case where the vibration strength at each location on the optical fiber 10 is in the appropriate range, the detection unit 22 determines that the opening amount of the water discharge gate 30 is appropriate, and in the other cases, the detection unit 22 determines that the opening amount of the water discharge gate 30 is inappropriate.

Alternatively, the detection unit 22 may determine whether the opening amount of the water discharge gate 30 is appropriate according to methods other than the method explained with reference to FIG. 4 to FIG. 6. Other methods include a method using pattern matching. For example, the detection unit 22 stores in advance, as matching patterns, vibration patterns that occur when the opening amount of the water discharge gate 30 is appropriate. The matching patterns may be the vibration patterns similar to FIG. 4 to FIG. 6, and there may be multiple matching patterns. The detection unit 22 detects the vibration pattern included in the return light with the matching patterns stored in advance. In a case where the matching rate between the vibration pattern included in the return light and any one of the matching patterns stored in advance is equal to or more than a threshold value, the detection unit 22 determines that the opening amount of the water discharge gate 30 is appropriate.

Subsequently, an example of a flow of overall operation of the optical fiber sensing system according to this first example embodiment is explained with reference to FIG. 7.

Figure 7:
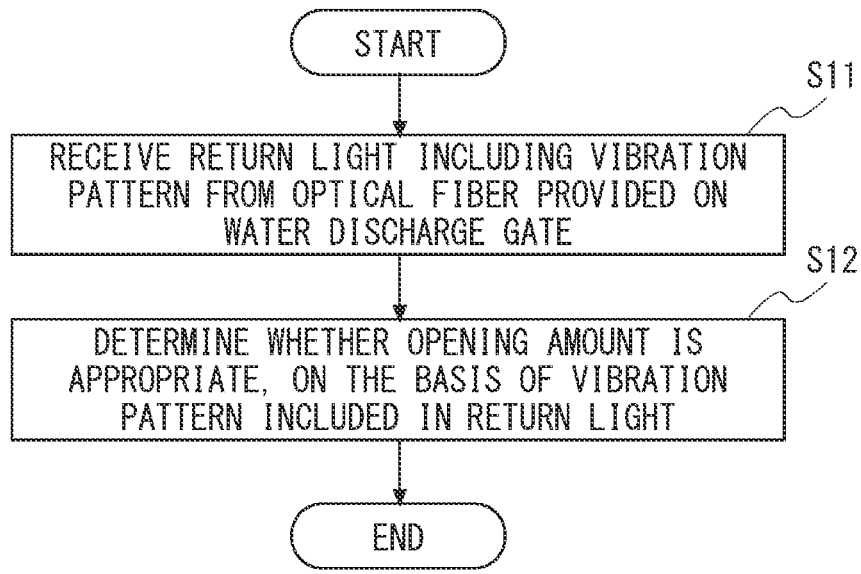
FIG. 7 is a flowchart illustrating an example of a flow of overall operation of the optical fiber sensing system according to the first example embodiment.

As illustrated in FIG. 7, the reception unit 21 receives the return light including the vibration pattern from the optical fiber 10 provided on the water discharge gate 30 (step S11).

Subsequently, the detection unit 22 determines whether the opening amount of the water discharge gate 30 is appropriate, on the basis of the vibration pattern included in the return light received by the reception unit 21 (step S12). For example, this detection may be performed using the method explained with reference to FIG. 4 to FIG. 6 and the like.

As described above, according to this first example embodiment, the reception unit 21 receives the return light including the vibration pattern from the optical fiber 10 provided on the water discharge gate 30. The detection unit 22 determines whether the opening amount of the water discharge gate 30 is appropriate, on the basis of the vibration pattern included in the return light received by the reception unit 21. Therefore, whether the opening amount of the water discharge gate 30 is appropriate can be determined.

Second Example Embodiment

The configuration of the optical fiber sensing system according to this second example embodiment is substantially the same as the configuration of the above-described first example embodiment, but the functions of the detection unit 22 are expanded.

In the above-described first example embodiment, the detection unit 22 determines whether the opening amount of the water discharge gate 30 is appropriate, on the basis of the vibration pattern included in the return light received by the reception unit 21.

In contrast, in this second example embodiment, furthermore, the detection unit 22 detects deterioration of the bolt 31 used in the water discharge gate 30, and detects the location where deterioration of the bolt 31 has occurred, on the basis of the vibration pattern included in the return light received by the reception unit 21.

In this case, an example of a method in which the detection unit 22 detects deterioration of the bolt 31 and the location where deterioration of the bolt 31 has occurred is explained with reference to FIG. 8.

Figure 8:
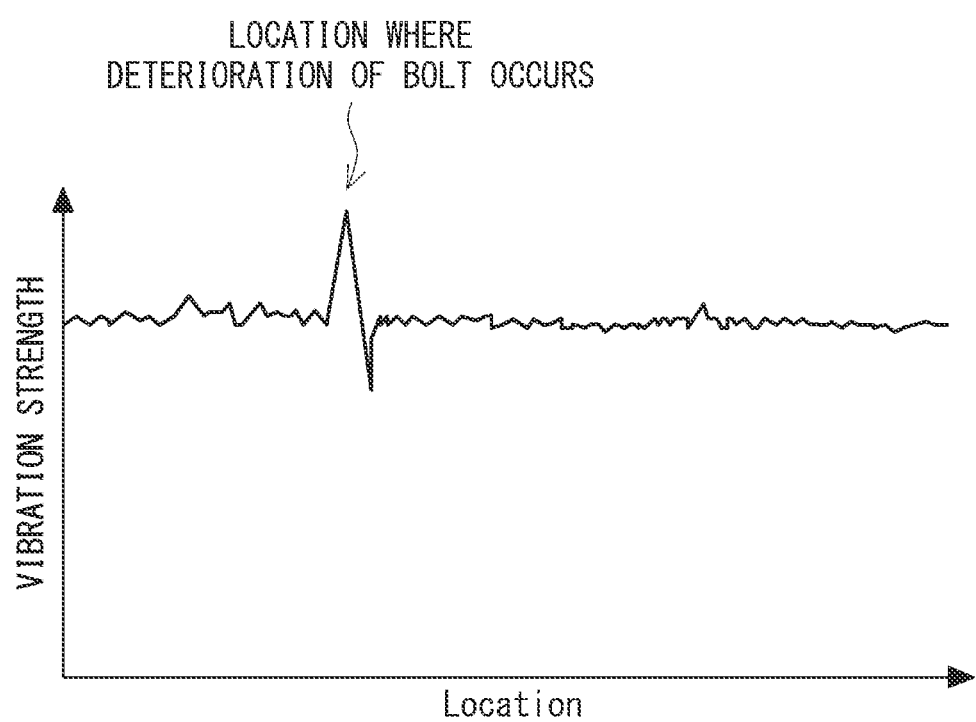
FIG. 8 is a diagram illustrating an example of a vibration pattern included in return light received by a reception unit according to a second example embodiment.

FIG. 8 illustrates an example of the vibration pattern included in the return light received by the reception unit 21, in which the horizontal axis and the vertical axis are as explained with respect to FIG. 4 to FIG. 6.

In the example of FIG. 8, among the locations on the optical fiber 10, there is a location where the vibration strength is sufficiently large as compared with other locations (for example, a location where the vibration strength is larger than other locations by a threshold value or more). In this case, the detection unit 22 detects that the bolt 31 has deteriorated at the corresponding location on the optical fiber 10, and further detects the corresponding location as the location where deterioration of the bolt 31 has occurred.

Alternatively, the detection unit 22 may detect deterioration of the bolt 31 and the location where the deterioration of the bolt 31 has occurred according to methods other than the method explained with reference to FIG. 8. Other methods include a method using pattern matching. For example, the detection unit 22 stores in advance, as a matching pattern, the vibration pattern that occurs when the bolt 31 has deteriorated. The matching pattern may be the vibration pattern similar to FIG. 8, and there may be multiple matching patterns. The detection unit 22 compares the vibration pattern included in the return light with the matching patterns stored in advance. In a case where the matching rate between the vibration pattern included in the return light and any one of the matching patterns stored in advance is equal to or more than a threshold value, the detection unit 22 determines that the bolt 31 has deteriorated. Also, the detection unit 22 may determine the location where the deterioration of the bolt 31 has occurred, by using the vibration pattern similar to FIG. 8, or on the basis of a time difference between the incident time of the pulsed light and the reception time of the return light.

Subsequently, an example of a flow of overall operation of the optical fiber sensing system according to this second example embodiment is explained with reference to FIG. 9.

Figure 9:
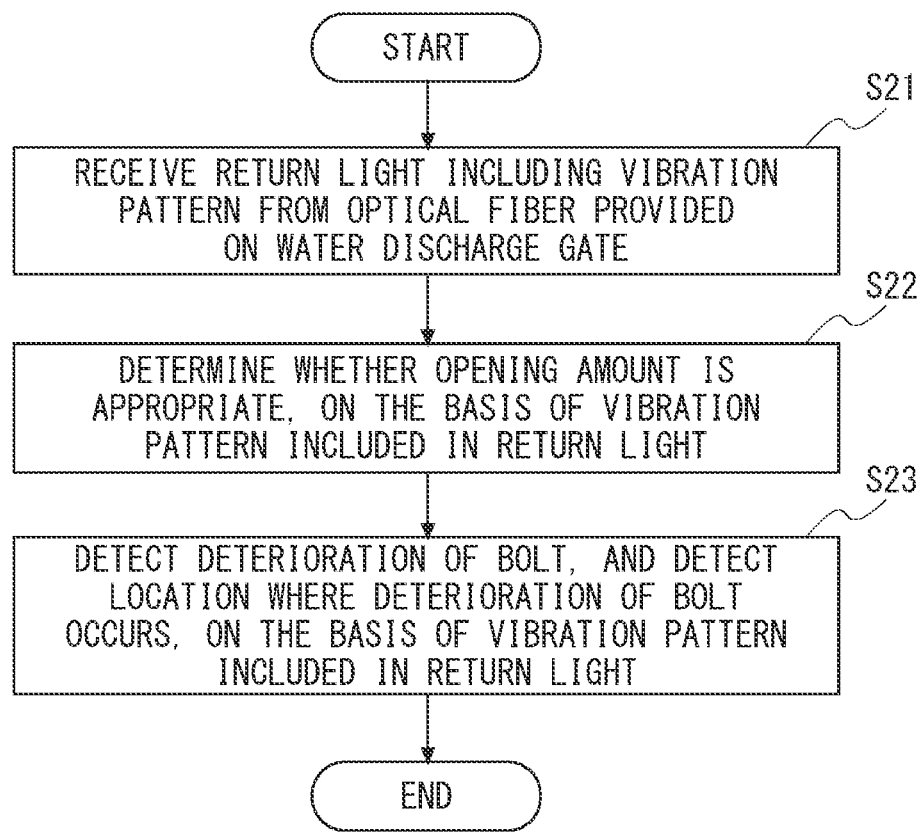
FIG. 9 is a flowchart illustrating an example of a flow of overall operation of an optical fiber sensing system according to the second example embodiment.

As illustrated in FIG. 9, first, steps S21 to S22 that are substantially the same as steps S11 to S12 of FIG. 7 are performed.

Subsequently, the detection unit 22 detects deterioration of the bolt 31 used in the water discharge gate 30, and detects the location where deterioration of the bolt 31 has occurred, on the basis of the vibration pattern included in the return light received by the reception unit 21 (step S23). For example, this detection may be performed using the method explained with reference to FIG. 8.

According to this second example embodiment as described above, furthermore, the detection unit 22 detects deterioration of the bolt 31 used in the water discharge gate 30, and detects the location where deterioration of the bolt 31 has occurred, on the basis of the vibration pattern included in the return light received by the reception unit 21. Therefore, it can be determined that the bolt 31 has deteriorated, and the location where deterioration of the bolt 31 has occurred can be identified.

Other advantages are substantially the same as those of the above-described first example embodiment.

Third Example Embodiment

Subsequently, an example of configuration of an optical fiber sensing system according to this third example embodiment is explained with reference to FIG. 10.

Figure 10:
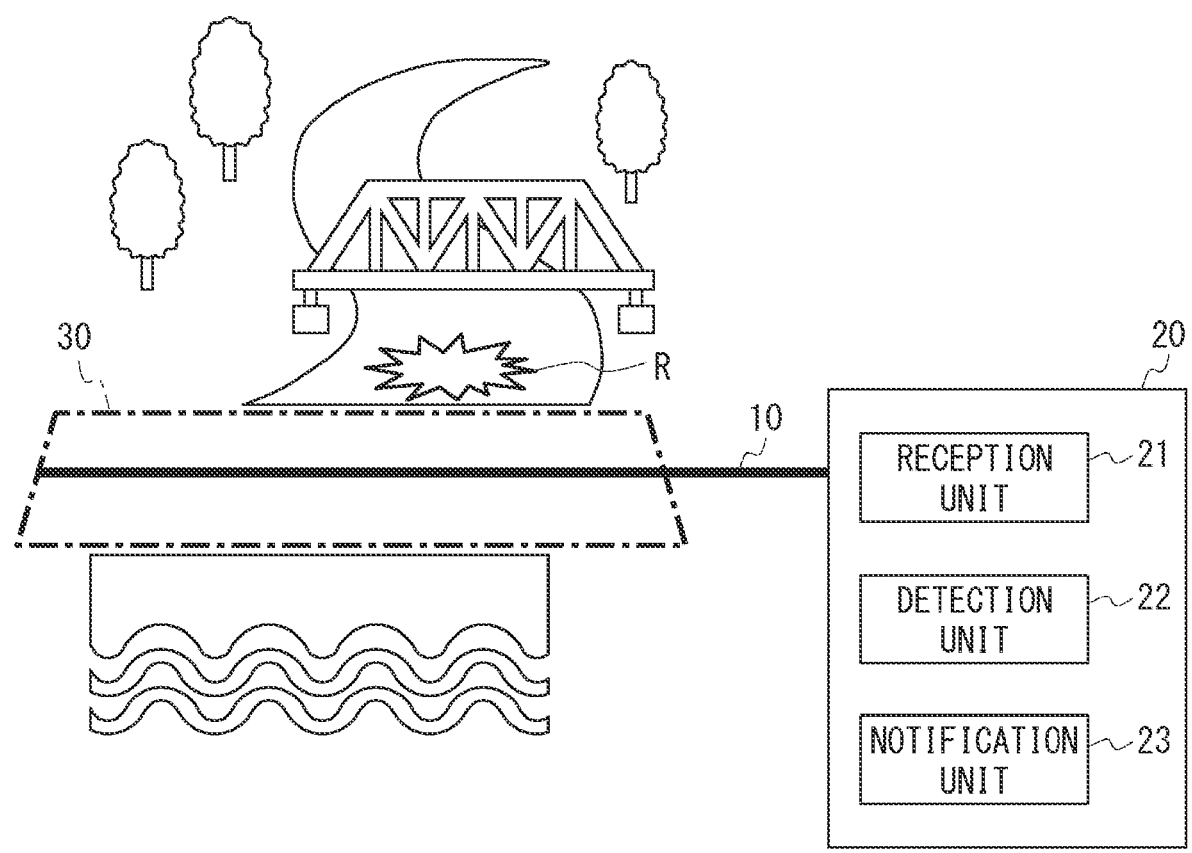
FIG. 10 is a diagram illustrating an example of configuration of an optical fiber sensing system according to a third example embodiment.

As illustrated in FIG. 10, the optical fiber sensing system according to this third example embodiment is different from the configuration of the above-described first example embodiment in that a notification unit 23 is added to the optical fiber sensing apparatus 20.

In a case where the detection unit 22 detects that the opening amount of the water discharge gate 30 is inappropriate, the notification unit 23 sends a predetermined terminal (not illustrated) a notification that the opening amount of the water discharge gate 30 is inappropriate. For example, the predetermined terminal is a terminal carried by an observer on the site, a terminal installed in a monitoring center, and the like. Therefore, in a case where the opening amount of the water discharge gate 30 is inappropriate, the observer on the site can adjust the opening amount of the water discharge gate 30. A method of notification may be, for example, a method for displaying a GUI (Graphical User Interface) screen on a display, a monitor, or the like of the predetermined terminal, or may be a method for outputting a message, as voice, through a speaker of the predetermined terminal.

Also, the notification unit 23 sends the predetermined terminal a notification that the opening amount of the water discharge gate 30 at the current time is large or small. For example, in the example of FIG. 4, the notification unit 23 sends a notification that the opening amount of the water discharge gate 30 at the current time is small, and in the example of FIG. 5, the notification unit 23 sends a notification that the opening amount of the water discharge gate 30 at the current time is large. Therefore, the observer on the site can easily judge which of the larger side or the smaller side the opening amount of the water discharge gate 30 is to be adjusted to.

Subsequently, an example of a flow of overall operation of the optical fiber sensing system according to this third example embodiment is explained with reference to FIG. 11.

Figure 11:
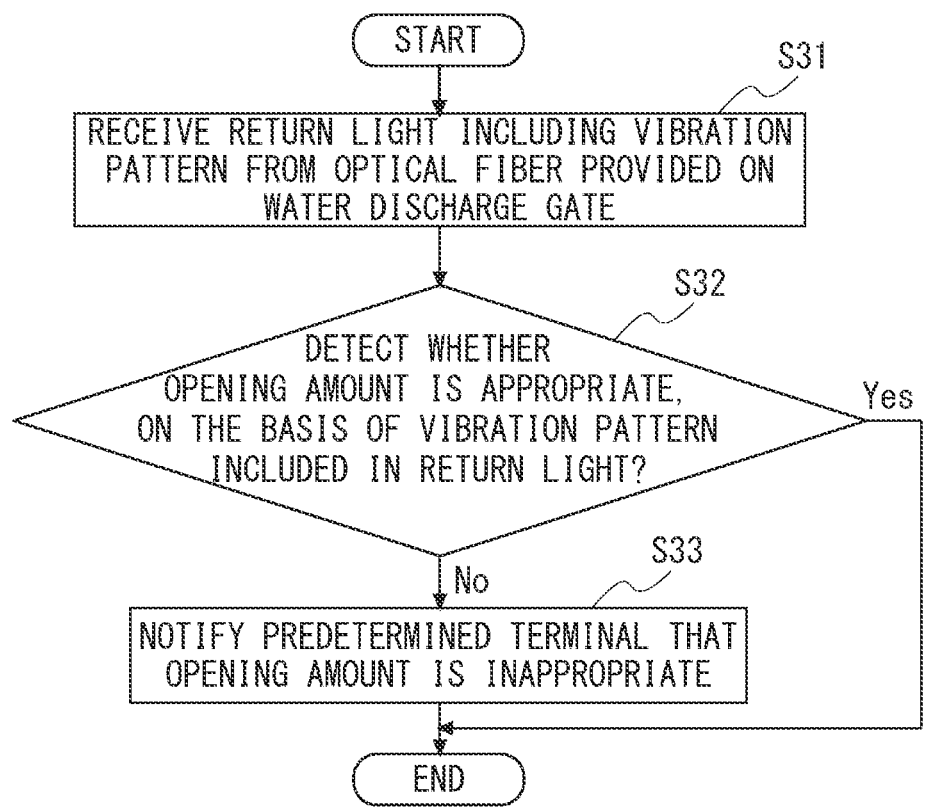
FIG. 11 is a flowchart illustrating an example of a flow of overall operation of the optical fiber sensing system according to the third example embodiment.

As illustrated in FIG. 11, first, the reception unit 21 receives the return light including the vibration pattern from the optical fiber 10 provided on the water discharge gate 30 (step S31). Subsequently, the detection unit 22 determines whether the opening amount of the water discharge gate 30 is appropriate, on the basis of the vibration pattern included in the return light received by the reception unit 21 (step S32).

In a case where the detection unit 22 detects that the opening amount of the water discharge gate 30 is inappropriate in step S32 (No in step S32), the notification unit 23 sends the predetermined terminal a notification that the opening amount of the water discharge gate 30 is inappropriate (step S33). For example, this notification may be performed by methods for displaying on the screen or outputting, as voice, a message indicating the opening amount of the water discharge gate 30 is inappropriate, as described above.

As described above, according to this third example embodiment, in a case where the detection unit 22 detects that the opening amount of the water discharge gate 30 is inappropriate, the notification unit 23 sends the predetermined terminal a notification that the opening amount of the water discharge gate 30 is inappropriate. Therefore, the notification that the opening amount of the water discharge gate 30 is inappropriate can be sent to the predetermined terminal. In a case where the predetermined terminal is a terminal carried by the observer on the site, the observer can adjust the opening amount of the water discharge gate 30 upon receiving this notification. Therefore, the opening amount can be adjusted to such an amount that not only the deterioration of the water discharge gate 30 and the bolt 31 can be alleviated but also wasting of the resource (water) can be alleviated.

Other advantages are substantially the same as those of the above-described first example embodiment.

It should be noted that this third example embodiment may be combined with the above-described second example embodiment. For example, in a case where the detection unit 22 detects deterioration of the bolt 31 and detects the location where deterioration of the bolt 31 has occurred, the notification unit 23 may send the predetermined terminal a notification that the bolt 31 has deteriorated and a notification of the location where deterioration of the bolt 31 has occurred.

Fourth Example Embodiment

In the above-described third example embodiment, it is assumed that the observer on the site adjusts the opening amount of the water discharge gate 30.

In contrast, in this fourth example embodiment, it is assumed that the optical fiber sensing apparatus 20 controls (adjusts) the opening amount of the water discharge gate 30 by remote operations.

Hereinafter, an example of configuration of an optical fiber sensing system according to this fourth example embodiment is explained with reference to FIG. 12.

Figure 12:
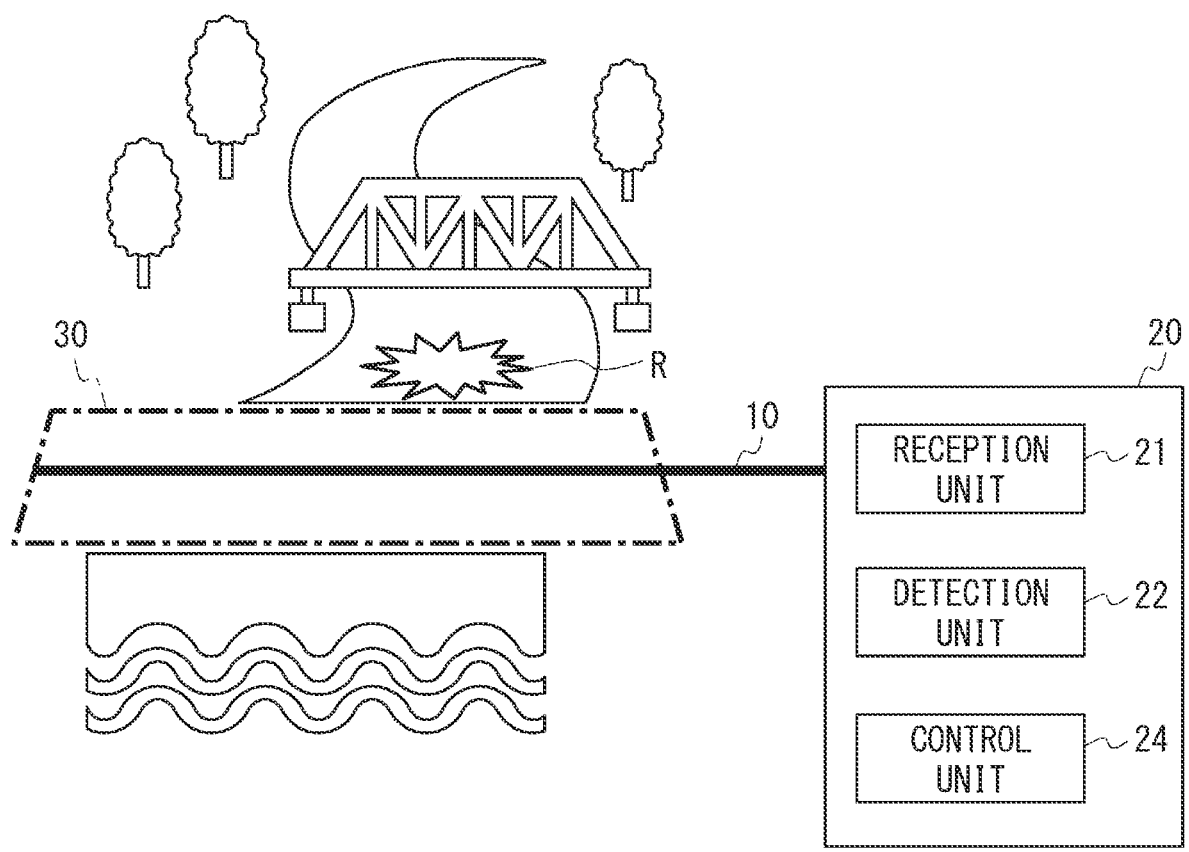
FIG. 12 is a diagram illustrating an example of configuration of an optical fiber sensing system according to a fourth example embodiment.

As illustrated in FIG. 12, the optical fiber sensing system according to this fourth example embodiment is different from the configuration of the above-described first example embodiment in that a control unit 24 is added to the optical fiber sensing apparatus 20.

In a case where the detection unit 22 detects that the opening amount of the water discharge gate 30 is inappropriate, the control unit 24 determines an appropriate opening amount of the water discharge gate 30 on the basis of the vibration pattern included in the return light received by the reception unit 21 and the opening amount of the water discharge gate 30 at a point in time thereof. For example, the control unit 24 may generate, in advance through machine learning and the like, a learning model that outputs an appropriate opening amount in response to inputs of the opening amount of the water discharge gate 30 and the vibration pattern, and may determine the appropriate opening amount of the water discharge gate 30 by using the learning model generated in advance.

Also, the control unit 24 has a function of controlling the opening amount of the water discharge gate 30 by remote operations. For example, in a case where the water discharge gate 30 has the structure as in FIG. 3, the control unit 24 controls the opening amount of the water discharge gate 30 by remotely operating an opening or closing mechanism (not illustrated) that opens or closes the door body 32.

In a case where the detection unit 22 detects that the opening amount of the water discharge gate 30 is inappropriate, the control unit 24 performs control so as to cause the opening amount of the water discharge gate 30 to be the determined appropriate opening amount by remote operations.

Subsequently, an example of a flow of overall operation of the optical fiber sensing system according to this fourth example embodiment is explained with reference to FIG. 13.

Figure 13:
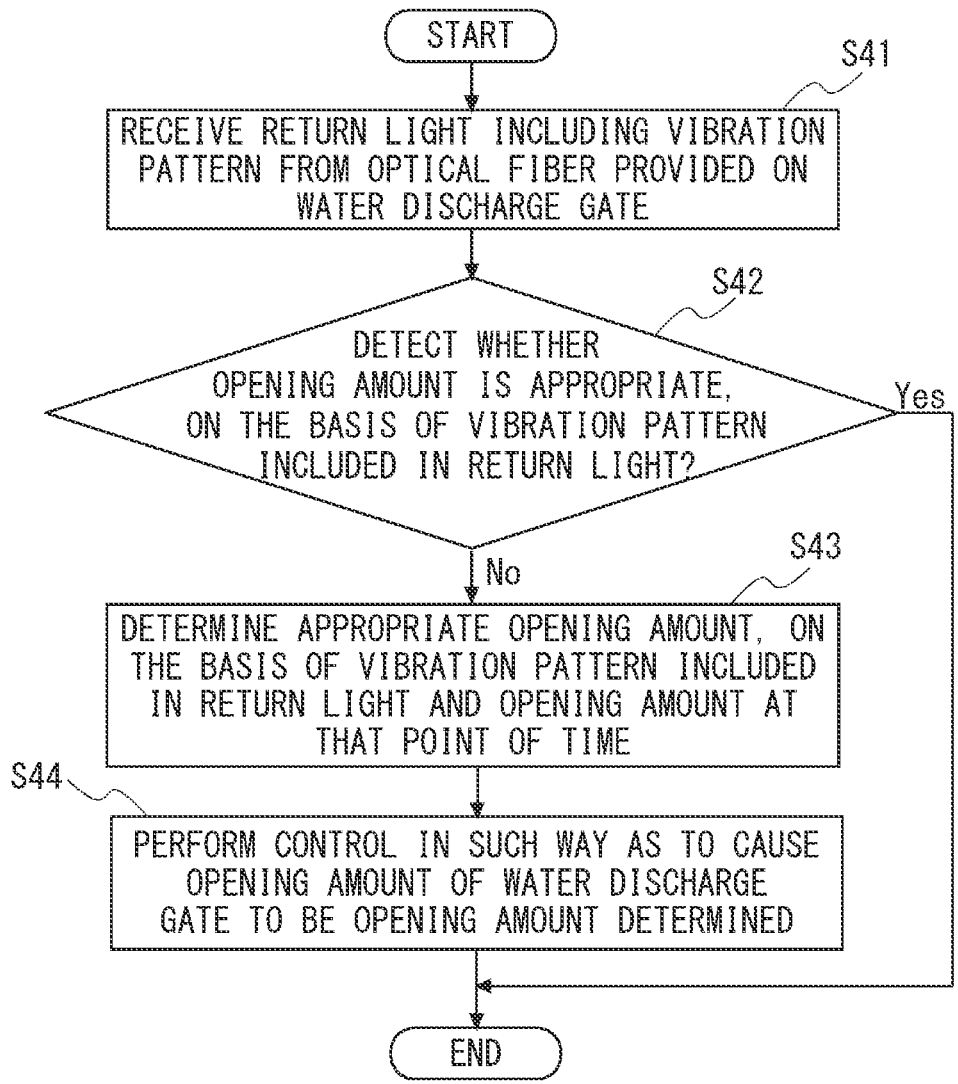
FIG. 13 is a flowchart illustrating an example of a flow of overall operation of the optical fiber sensing system according to the fourth example embodiment.

As illustrated in FIG. 13, first, the reception unit 21 receives the return light including the vibration pattern from the optical fiber 10 provided on the water discharge gate 30 (step S41). Subsequently, the detection unit 22 determines whether the opening amount of the water discharge gate 30 is appropriate, on the basis of the vibration pattern included in the return light received by the reception unit 21 (step S42).

In a case where detection unit 22 detects that the opening amount of the water discharge gate 30 is inappropriate in step S42 (No in step S42), the control unit 24 determines the appropriate opening amount of the water discharge gate 30, on the basis of the vibration pattern included in the return light received by the reception unit 21 and the opening amount of the water discharge gate 30 at a point in time thereof (step S43). For example, as described above, this determination may be performed by using the method using the learning model and the like.

Subsequently, the control unit 24 performs control so as to cause the opening amount of the water discharge gate 30 to be the appropriate opening amount determined in step S43 (step S44). For example, as described above, this control may be performed by using, e.g., a method of remotely operating the opening or closing mechanism that opens or closes the door body 32.

As described above, according to this fourth example embodiment, in a case where the detection unit 22 detects that the opening amount of the water discharge gate 30 is inappropriate, the control unit 24 determines the appropriate opening amount of the water discharge gate 30 on the basis of the vibration pattern included in the return light received by the reception unit 21 and the opening amount of the water discharge gate 30 at a point in time thereof, and performs control so as to cause the opening amount of the water discharge gate 30 to be the above-described determined appropriate opening amount. Therefore, the water discharge gate 30 can be controlled to attain such an appropriate opening amount that not only the deterioration of the water discharge gate 30 and the bolt 31 can be alleviated but also wasting of the resource (water) can be alleviated. In addition, it is not necessary to dispatch the observer on the site to the water discharge gate 30 in order to adjust the opening amount of the water discharge gate 30.

Other advantages are substantially the same as those of the above-described first example embodiment.

Other Example Embodiments

In the example of FIG. 1, FIG. 2, FIG. 10, and FIG. 12, multiple constituent elements (the reception unit 21, the detection unit 22, the notification unit 23, and the control unit 24) are provided in the optical fiber sensing apparatus 20, but the example embodiments are not limited thereto. The constituent elements provided in the optical fiber sensing apparatus 20 do not have to be necessarily provided in a single device, and may be provided across multiple devices in a distributed manner.

<Hardware Configuration of Optical Fiber Sensing Apparatus>

Next, hereinafter, a hardware configuration of a computer 40 that achieves the optical fiber sensing apparatus 20 is explained with reference to FIG. 14.

Figure 14:
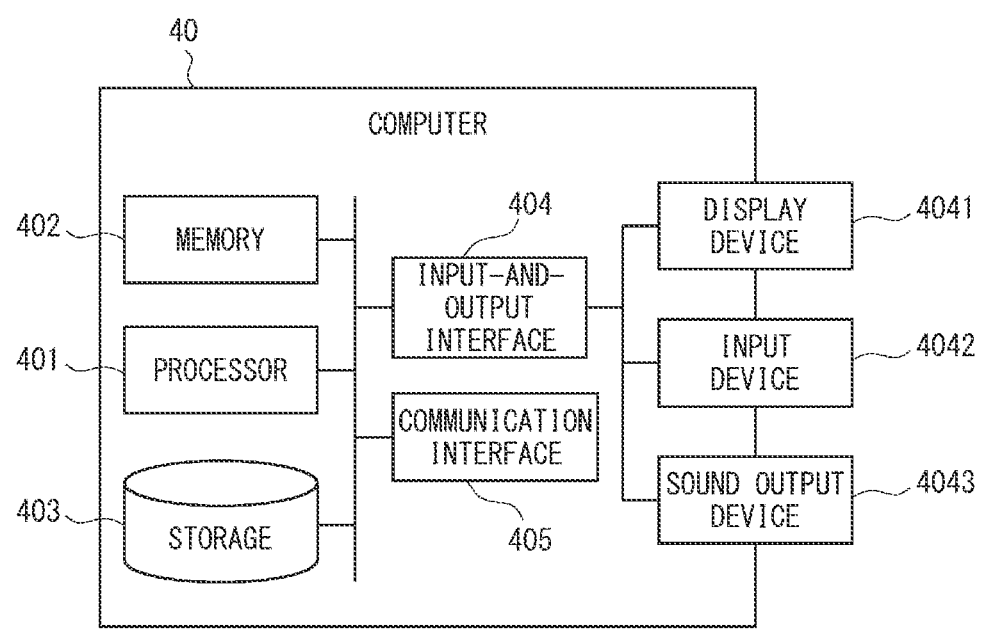
FIG. 14 is a block diagram illustrating an example of hardware configuration of a computer that achieves an optical fiber sensing apparatus.

As illustrated in FIG. 14, the computer 40 includes a processor 401, a memory 402, a storage 403, an input-and-output interface (an input-and-output I/F) 404, a communication interface (a communication I/F) 405, or the like. The processor 401, the memory 402, the storage 403, the input-and-output interface 404, and the communication interface 405 are connected by a data transmission path for transmitting and receiving data with each other.

The processor 401 is an arithmetic processing unit such as, for example, a CPU (Central Processing Unit), a GPU (Graphics Processing Unit), or the like. For example, the memory 402 is a memory such as a RAM (Random Access Memory), a ROM (Read Only Memory), or the like. The storage 403 is a storage device such as, for example, an HDD (Hard Disk Drive), an SSD (Solid State Drive), a memory card, or the like. Also, the storage 403 may be a memory such as a RAM, a ROM, or the like.

The storage 403 stores programs that achieve the functions of the constituent element (the reception unit 21, the detection unit 22, the notification unit 23, and the control unit 24) provided in the optical fiber sensing apparatus 20. The processor 401 achieves the functions of the constituent elements provided in the optical fiber sensing apparatus 20 by executing the programs. In this case, when executing the above-described programs, the processor 401 may execute the programs upon reading the programs to the memory 402, or may execute the programs without reading the programs to the memory 402. The memory 402 and the storage 403 may also achieves the function of storing information and data held by the constituent elements provided in the optical fiber sensing apparatus 20.

The above-described programs may be stored using various types of non-transitory computer readable media and provided to a computer (including the computer 40). The non-transitory computer readable media include various types of tangible storage media. Examples of non-transitory computer readable media include a magnetic recording medium (for example, a flexible disk, a magnetic tape, and a hard disk drive), a magneto-optical recording medium (for example, a magneto-optical disk), a CD-ROM (Compact Disc-ROM), a CD-R (CD-Recordable), a CD-R/W (CD-ReWritable), a semiconductor memory (for example, a mask ROM, a PROM (Programmable ROM), an EPROM (Erasable PROM), a flash ROM, and a RAM. The programs may be provided to the computer by various types of transitory computer readable media. Examples of transitory computer readable media include electric signals, optical signals, and electromagnetic waves. The transitory computer readable media can provide the programs to the computer via a wired communication path such as an electric wire and an optical fiber or via a wireless communication path.

The input-and-output interface 404 is connected to a display device 4041, an input device 4042, a sound output device 4043, and the like. The display device 4041 is a device, such as an LCD (Liquid Crystal Display), a CRT (Cathode Ray Tube) display, a monitor, or the like, that displays a screen associated to drawing data processed by the processor 401. The input device 4042 is a device that receives operator's operation inputs, such as, for example, a keyboard, a mouse, a touch sensor, or the like. The display device 4041 and the input device 4042 may be integrated and achieved as a touch panel. The sound output device 4043 is a device, such as a speaker, that outputs sound associated to sound data processed by the processor 401.

The communication interface 405 transmits and receives data to and from an external device. For example, the communication interface 405 communicates with an external device via a wired communication path or a wireless communication path.

Although the present disclosure has been described above with reference to the example embodiments, the present disclosure is not limited to the above-described example embodiments. With respect to the configuration and details of the present disclosure, various changes that can be understood by those skilled in the art can be made within the scope of the present disclosure.

For example, some or all of the above-described example embodiments may be used in combination.

Also, some or all of the above-described example embodiments may be described as shown in the following Supplementary Notes, but are not limited thereto.

(Supplementary Note 1)

An optical fiber sensing system comprising:
an optical fiber provided on a water discharge gate of a reservoir or in a vicinity of the water discharge gate;
a reception unit configured to receive an optical signal including a vibration pattern from the optical fiber; and
a detection unit configured to detect whether an opening amount of the water discharge gate is appropriate, based on a vibration pattern included in the optical signal.

(Supplementary Note 2)

The optical fiber sensing system according to Supplementary Note 1, wherein the detection unit is configured to detect deterioration of a bolt being used in the water discharge gate, based on a vibration pattern included in the optical signal.

(Supplementary Note 3)

The optical fiber sensing system according to Supplementary Note 2, wherein the detection unit is configured to detect a location where deterioration of the bolt occurs, based on a vibration pattern included in the optical signal.

(Supplementary Note 4)

The optical fiber sensing system according to any one of Supplementary Notes 1 to 3, further comprising a notification unit configured to notify a predetermined terminal that an opening amount of the water discharge gate is inappropriate in a case where the detection unit detects that the opening amount of the water discharge gate is inappropriate.

(Supplementary Note 5)

The optical fiber sensing system according to any one of Supplementary Notes 1 to 3, further comprising a control unit configured to determine an opening amount of the water discharge gate, based on a vibration pattern included in the optical signal and an opening amount of the water discharge gate at that point of time, and perform control in such a way as to cause an opening amount of the water discharge gate to attain the determined opening amount, in a case where the detection unit detects that an opening amount of the water discharge gate is inappropriate.

(Supplementary Note 6)

An optical fiber sensing apparatus comprising:
a reception unit configured to receive an optical signal including a vibration pattern from an optical fiber provided on a water discharge gate of a reservoir or in a vicinity of the water discharge gate; and
a detection unit configured to detect whether an opening amount of the water discharge gate is appropriate, based on a vibration pattern included in the optical signal.

(Supplementary Note 7)

The optical fiber sensing apparatus according to Supplementary Note 6, wherein the detection unit is configured to detect deterioration of a bolt being used in the water discharge gate, based on a vibration pattern included in the optical signal.

(Supplementary Note 8)

The optical fiber sensing apparatus according to Supplementary Note 7, wherein the detection unit is configured to detect a location where deterioration of the bolt occurs, based on a vibration pattern included in the optical signal.

(Supplementary Note 9)

The optical fiber sensing apparatus according to any one of Supplementary Notes 6 to 8, further comprising a notification unit configured to notify a predetermined terminal that an opening amount of the water discharge gate is inappropriate in a case where the detection unit detects that the opening amount of the water discharge gate is inappropriate.

(Supplementary Note 10)

The optical fiber sensing apparatus according to any one of Supplementary Notes 6 to 8, further comprising a control unit configured to determine an opening amount of the water discharge gate, based on a vibration pattern included in the optical signal and an opening amount of the water discharge gate at that point of time, and perform control in such a way as to cause an opening amount of the water discharge gate to attain the determined opening amount, in a case where the detection unit detects that an opening amount of the water discharge gate is inappropriate.

(Supplementary Note 11)

A reservoir monitoring method by an optical fiber sensing system, the method comprising:
a reception step of receiving an optical signal including a vibration pattern from an optical fiber provided on a water discharge gate of a reservoir or in a vicinity of the water discharge gate; and a detection step of detecting whether an opening amount of the water discharge gate is appropriate, based on a vibration pattern included in the optical signal.

(Supplementary Note 12)

The reservoir monitoring method according to Supplementary Note 11, wherein, in the detection step, deterioration of a bolt being used in the water discharge gate is detected based on a vibration pattern included in the optical signal.

(Supplementary Note 13)

The reservoir monitoring method according to Supplementary Note 12, wherein, in the detection step, a location where deterioration of the bolt occurs is detected based on a vibration pattern included in the optical signal.

(Supplementary Note 14)

The reservoir monitoring method according to any one of Supplementary Notes 11 to 13, further comprising a notification step of notifying a predetermined terminal that an opening amount of the water discharge gate is inappropriate in a case where it is detected, in the detection step, that the opening amount of the water discharge gate is inappropriate.

(Supplementary Note 15)

The reservoir monitoring method according to any one of Supplementary Notes 11 to 13, further comprising a control step of determining an opening amount of the water discharge gate, based on a vibration pattern included in the optical signal and an opening amount of the water discharge gate at that point of time, and controlling an opening amount of the water discharge gate to be the determined opening amount, in a case where it is detected, in the detection step, that an opening amount of the water discharge gate is inappropriate.

REFERENCE SIGNS LIST

10 Optical fiber
20 Optical fiber sensing apparatus
21 Reception unit
22 Detection unit
23 Notification unit
24 Control unit
30 Water discharge gate
31A, 31B Bolt
32 Door body
40 Computer
401 Processor
402 Memory
403 Storage
404 Input-and-output interface
4041 Display device
4042 Input device
4043 Sound output device
405 Communication interface

What is claimed is:

1. An optical fiber sensing system comprising:
a optical fiber provided on a water discharge gate of a reservoir or in a vicinity of the water discharge gate;
a reception unit configured to receive an optical signal including a vibration pattern from the optical fiber; and
a detection unit configured to detect whether an opening amount of the water discharge gate is appropriate, using the vibration pattern.

2. The optical fiber sensing system according to claim 1, wherein the detection unit is configured to detect deterioration of a bolt being used in the water discharge gate using the vibration pattern.

3. The optical fiber sensing system according to claim 2, wherein the detection unit is configured to detect a location where deterioration of the bolt occurs using the vibration pattern.

4. The optical fiber sensing system according to claim 1, further comprising a notification unit configured to notify a predetermined terminal that the opening amount of the water discharge gate is inappropriate if the detection unit detects that the opening amount of the water discharge gate is inappropriate.

5. The optical fiber sensing system according to claim 1, further comprising a control unit configured to determine the opening amount of the water discharge gate using the vibration pattern and an opening amount of the water discharge gate at that point of time,
wherein the control unit is further configured to cause the opening amount of the water discharge gate to be the determined opening amount, if the detection unit detects that the opening amount of the water discharge gate is inappropriate.

6. The optical fiber sensing system according to claim 1, wherein the reception unit is configured to receive backscattered light from the optical fiber, and
wherein the reception unit is configured to determine the vibration pattern using the backscattered light.

7. The optical fiber sensing system according to claim 1, wherein the detection unit is configured to determine that the opening amount of the water discharge gate is appropriate in response to a determination that a vibration strength of the vibration pattern is within a predetermined range.

8. An optical fiber sensing apparatus comprising:
a reception unit configured to receive backscattered light from an optical fiber provided on a water discharge gate of a reservoir or in a vicinity of the water discharge gate, and to determine a vibration pattern using the backscattered light; and
a detection unit configured to detect whether an opening amount of the water discharge gate is appropriate using the vibration pattern.

9. The optical fiber sensing apparatus according to claim 8, wherein the detection unit is configured to detect deterioration of a bolt being used in the water discharge gate using the vibration pattern.

10. The optical fiber sensing apparatus according to claim 9, wherein the detection unit is configured to detect a location where deterioration of the bolt occurs using the vibration pattern.

11. The optical fiber sensing apparatus according to claim 8, further comprising a notification unit configured to notify a predetermined terminal that the opening amount of the water discharge gate is inappropriate if the detection unit detects that the opening amount of the water discharge gate is inappropriate.

12. The optical fiber sensing apparatus according to claim 8, further comprising a control unit configured to determine the opening amount of the water discharge gate using the vibration pattern and an opening amount of the water discharge gate at that point of time,
wherein the control unit is further configured to control the opening amount of the water discharge gate to be the determined opening amount, if the detection unit detects that the opening amount of the water discharge gate is inappropriate.

13. The optical fiber sensing apparatus according to claim 8, wherein the reception unit is directly connected to the optical fiber.

14. The optical fiber sensing apparatus according to claim 8, wherein the detection unit is configured to determine that the opening amount of the water discharge gate is appropriate in response to a determination that a vibration strength of the vibration pattern is within a predetermined range.

15. A reservoir monitoring method by of an optical fiber sensing system, the method comprising:
   a reception operation comprising:
      receiving backscattered light from an optical fiber provided on a water discharge gate of a reservoir or in a vicinity of the water discharge gate; and
      determining a vibration pattern using the backscattered light; and
   a detection operation comprising detecting whether an opening amount of the water discharge gate is appropriate using the vibration pattern.

16. The reservoir monitoring method according to claim 15, wherein the detection operation further comprises detecting deterioration of a bolt used in the water discharge gate using the vibration pattern.

17. The reservoir monitoring method according to claim 16, wherein, in the detection operation further comprises detecting a location where deterioration of the bolt occurs using the vibration pattern.

18. The reservoir monitoring method according claim 15, further comprising a notification operation comprising notifying a predetermined terminal that the opening amount of the water discharge gate is inappropriate if the detection operation detects, that the opening amount of the water discharge gate is inappropriate.

19. The reservoir monitoring method according to claim 15, further comprising a control operation comprising:
   determining the opening amount of the water discharge gate using the vibration pattern and an opening amount of the water discharge gate at that point of time; and
   controlling the opening amount of the water discharge gate to be the determined opening amount, if the detection operation detects, that the opening amount of the water discharge gate is inappropriate.

20. The reservoir monitoring method according to claim 15, wherein the detection operation further comprises determining that the opening amount of the water discharge gate is appropriate in response to a determination that a vibration strength of the vibration pattern is within a predetermined range.

* * * * *